United States Patent [19]

Omoto et al.

[11] Patent Number: 4,935,814
[45] Date of Patent: Jun. 19, 1990

[54] PICTURE QUALITY INDICATOR FOR SATELLITE BROADCASTING RECEIVER

[75] Inventors: Noriaki Omoto; Mitsugu Kuboki; Osamu Shizuya; Yoshikazu Yoshimura, all of Takatsuki, Japan

[73] Assignee: Matsushita Electric Industrial Co., Ltd., Kadoma, Japan

[21] Appl. No.: 291,234

[22] Filed: Dec. 28, 1988

[30] Foreign Application Priority Data

Dec. 29, 1987 [JP] Japan ................. 62-334535

[51] Int. Cl.$^5$ .............................................. H04N 5/50
[52] U.S. Cl. .............................. 358/139; 358/192.1; 358/188
[58] Field of Search ............ 358/139, 188, 191.1, 358/192.1; 343/757, 760, 894; 455/193, 230, 269, 276; 342/75

[56] References Cited

U.S. PATENT DOCUMENTS

| | | | |
|---|---|---|---|
| 4,125,809 | 11/1978 | Mott ................................... | 455/226 X |
| 4,214,273 | 7/1980 | Brown ............................... | 358/192.1 |
| 4,281,348 | 7/1981 | Shizuya ............................. | 358/188 |
| 4,349,840 | 9/1982 | Henderson ........................ | 358/188 |
| 4,605,968 | 8/1986 | Hayashi ............................ | 358/188 |
| 4,658,438 | 4/1987 | Kamata et al. .................... | 358/188 |
| 4,721,997 | 1/1988 | Wittrock .......................... | 358/139 X |
| 4,723,303 | 2/1988 | Koch ............................... | 324/57 R X |

FOREIGN PATENT DOCUMENTS 0117598 9/1984 European Pat. Off. .
3121611 12/1982 Fed. Rep. of Germany .
3513361 10/1986 Fed. Rep. of Germany .

OTHER PUBLICATIONS

"World Broadcasting—Satellite Administrative Radio Conference", Geneva 1977, pp. 93–97 and cover sheets. Satellite Broadcasting Receiver Part 1 Specification of Target, Dempa-Gijitu Kyoukai, Jun. 1983.

Primary Examiner—James J. Groody
Assistant Examiner—Mark R. Powell
Attorney, Agent, or Firm—Cushman, Darby & Cushman

[57] ABSTRACT

By the extraction of the noise component from the FM demodulated output and the detection thereof, the output proportional to the noise power is obtained, and it is indicated as the CN ratio of the received signal. This quality indication of the received signal makes the antenna pointing angle adjustment easier than before, and also realizes the picture quality indication for a satellite broadcasting receiver.

4 Claims, 11 Drawing Sheets

PICTURE QUALITY INDICATOR FOR SATELLITE BROADCASTING RECEIVER

FIELD OF THE INVENTION AND RELATED ART STATEMENT

1. Field of the Invention

The present invention relates to a satellite broadcasting receiver, and particularly relates to a received picture quality indicator of the satellite broadcasting receiver that can be used for the installation pointing angle adjustment of an antenna by use of the quality indication of received broadcasting waves.

2. Description of the Prior Art

A rather long time has passed since the transmission of TV signals between broadcasting stations utilizing geostationary satellites was put into practical use. And, the satellite broadcasting for the actual public service to be received by individual domestic receivers has been started. The conventional satellite broadcasting, for example used in Japan, is that, as shown in FIG. 13. Microwave carrier wave is modulated by TV signals and radiated from a geostationary satellite. And at the ground, it is focused by a satellite broadcasting reception antenna 31 (in Japan this antenna is named and called a BS antenna, hence it is also referred to as BS antenna hereinafter). Then, the microwave carrier wave is converted into 1-GHz band using a satellite broadcasting converter 32 (in Japan this is named an called a BS converter, and hereinafter it is referred to as BS converter) which includes a ultra-low noise amplifier. Using a coaxial cable 33 the output signal from the BS converter 32 is sent to a satellite broadcasting receiver 34 (in Japan it is named and called a BS tuner, then also hereinafter it is referred to as BS tuner) which is usually installed inside of a house. Then, the channel is selected and signal processing such as FM-demodulation is carried out, and the output of video and audio signals are delivered to a TV receiver 35.

To get high quality pictures on a TV screen, it is necessary to increase the SN ratio (signal to noise ratio) of the demodulated video signals. Since the SN ratio of the demodulated video signal is proportional to the CN ratio (carrier to noise ratio), it is also necessary to increase the CN ratio to attain high quality pictures. In order to get a larger CN ratio, it is necessary to keep the noise level as low as possible by using a low noise BS converter and also to raise the carrier level as high as possible by using a high gain BS antenna. As for a BS antenna, for the direct reception system as is described here, antennas of high gains such as of 35 dBi are ordinarily used, so their directivities necessarily become extremely sharp such as around 2 degrees in their half-maximum angle. Consequently, in order to extract the capability of those antennas, it becomes necessary to make the antenna point precisely to the incident carrier wave direction at the time of antenna installation.

For this purpose, heretofore the AGC terminal voltage in the BS tuner 34 has been utilized for adjusting antenna pointing angle (direction) and from which an output voltage proportional to the input signal power level to the BS tuner 34 is obtained and is indicated on such as a voltmeter 36 as shown in FIG. 13. A BS tuner wherein the antenna pointing angle adjustment is carried out by using the AGC output terminal voltage is constituted as shown, for example, in FIG. 14. FIG. 14 is an outline block diagram showing a part of a BS tuner from an input stage to an AGC detector stage of a first IF (intermediate frequency a). In FIG. 14, numeral 41 designates a first IF input terminal of the BS tuner, numeral 42 designates a first IF amplifier, numeral 43 designates a frequency converter, numeral 44 designates a local oscillator, numeral 45 designates an AGC amplifier (variable-gain amplifier), numeral 46 designates a band-pass filter (BPF), numeral 47 designates an AGC detector, numeral 48 designates a DC level-shift amplifier, and numeral 49 designates an AGC output terminal. The IF signal inputted through the first IF input terminal 41 is channel-selected by the frequency converter 43, and then, the signal is inputted through the AGC amplifier 45 and the BPF 46, to the demodulator. The AGC detector 47 detects the signal level, which issues a control voltage Vc responding to the detected level. The AGC amplifier 45 is a variable-gain amplifier, which makes the AGC detected level constant by changing the gain in accordance with the control voltage Vc.

FIG. 15 is a drawing showing an example of the gain control characteristic of the AGC amplifier 45. In general, since the forward AGC scheme employing transistors is used, the gain decreases as the gain control voltage increases. The time when the gain of the AGC amplifier is high corresponds to the case that the first IF input signal level is low, whereas the time when the gain of the AGC amplifier is low corresponds to the case that the first IF input signal level is high. Accordingly, the relation between the AGC control voltage Vc and the first IF input signal level becomes almost in a proportional relation as is shown in FIG. 16.

The first IF input signal level C of the BS tuner can be expressed by Eq. (1); (Refer to a literature: "Satellite Broadcasting Receiver, Part 1, Specification of Target, Dempa-Gijutu Kyoukai"):

$$C = (EIRP \cdot G_c \cdot G_r) \cdot X(\beta \cdot R \cdot L_f L_k) \quad (1)$$

where
- EIRP: Equivalent isotropic radiation power of satellite
- $L_f$: Free space propagation loss
- $G_r$: Antenna gain
- $\beta$: Antenna pointing loss
- R: Attenuation due to rain
- $G_c$: BS converter gain
- $L_k$: Attenuation due to cable.

According to Eq. (1), the first IF input signal proportion level of the BS tuner is in to the antenna pointing loss. Therefore, by delivering the AGC control voltage through an auxiliary output terminal provided on the BS converter and reading it by a voltmeter, it becomes possible to make the antenna pointing loss zero. Thus, the antenna pointing angle adjustment is achievable by making the first IF signal input level reach its maximum.

In such the constitution as described above, however, as is clear from Eq. (1), the level of first IF input signal of the BS tuner depends not only on the input intensity of the incident carrier wave into the BS antenna 1, which determines the picture quality, but also depends upon the gain of the BS converter and the attenuation of the coaxial cable connecting the BS converter to the BS tuner. The gain of the BS converter is usually 48 dB ± 4 dB, and the attenuation of the coaxial cable is in a range from 4 dB to 15 dB for lengths of 10 m to 30 m. Taking the sum of these attenuations, the range of the first IF input signal level becomes as wide as of 23 dB. Accordingly, in the conventional scheme, the AGC output terminal level varies depending on the gain of the BS converter as well as on the length of the coaxial cable either of which have no direct relation to the TV signal reception CN ratio in the BS reception system. For this reason, although the use of the AGC output terminal is useful for the antenna pointing angle adjustment, there has been a problem that it cannot be used for the indication of the measure of the received picture quality.

OBJECT AND SUMMARY OF THE INVENTION

The purpose of the present invention is to provide a stable received picture quality indication circuit that is capable of indicating the received picture quality (CN ratio) of the satellite broadcasting receiver apparatus, and be usable for the antenna pointing angle adjustment procedure at the time of antenna installation.

In order to achieve this purpose, a picture quality indicator for a satellite TV receiver of the present invention comprises: an 1) FM-demodulator for demodulating the satellite TV signal, 2) a band-pass filter for receiving a demodulated output as its input signal and removing e.g. the TV signal components, i.e., the video luminance component, the color sub-carrier component of the video signal and its second and third harmonics and the audio sub-carrier component and its harmonics from the demodulated output signal inputted thereto, thereby to extract a noise component, 3) an amplifier for amplifying the extracted noise e.g. up to an ample level for the detection including an amplitude limiting amplification function which lowers the amplification gain when the noise level becomes high, 4) a detection circuit for delivering DC outputs proportional to the amplified noise power level received thereby, and 5) a level indicator for indicating the quality of the reception picture in accordance with the above-mentioned output level received thereby.

In the present invention, by the constitution as described above, TV signals comprising the video signal, the audio sub-carrier, and the demodulated output components comprised of the demodulated noise component varying depending upon the BS antenna input level are issued from the FM-demodulator. Then, by the band-pass filter, only the demodulated noise component at frequency bands at which no TV signal is present, can be extracted. In the demodulated noise component at the signal detector output terminal of FM scheme, their noise amplitude increases as the demodulation frequency goes higher, they are called the rectangular noise. Therefore, the higher the frequency of the band-pass filter which is selected, the larger the noise voltage is obtained. And hence, from a band-pass filter whose center frequency is higher than the highest frequency component of the composite TV signal, the extraction of the noise component is made easily. And the noise voltage becomes decreasing as the BS antenna input level increases. The noise component extracted by the band-pass filter is amplified up to an ample level by an amplifier, and is then inputted into a detection circuit to detect the noise component, and thus, the DC output corresponding to the level of the noise voltage is obtained.

Hereupon, since the output level of the video signal of the demodulated TV signal is specified to be 1 $V_{p-p}$, the SN ratio of the video signal is inversely proportional to the DC output corresponding to the amount of the noise voltage detected as described above. Accordingly, if this DC output is converted into a DC output voltage proportional to the SN ratio, the degree of the receiver capability can be evaluated by this DC output. And, the level indicator superposes this DC output level on the TV signal, and by known function of the on-screen level indicator, SN ratio of the demodulated video signal is displayed on the picture screen of a TV receiver.

The relation between the SN ratio of the demodulated TV signal and the CN ratio of the received signal can be expressed by the equation $$(S/N) = I_{FM} \cdot I_{EMP}(C/N) \qquad (2).$$

In Eq. (2), $I_{FM}$ represents the FM improvement factor, $I_{EMP}$ indicates the factor of improvement by the emphasis. Upon application of Japanese satellite broadcasting specifications, $I_{FM}$ and $I_{EMP}$ become $I_{FM}=21$ dB and $I_{EMP}=2.9$ dB. According to Eq. (2), the SN ratio and the CN ratio are in a proportional relation, then when the CN ratio changes due to the gain variation by the change of antenna pointing direction, the SN ratio also changes, thus by displaying the SN ratio on a displayed TV picture screen, it can be utilized for the antenna pointing angle adjustment at the time of antenna installation.

Furthermore, in case that an amplitude limiting type amplifier is used for the amplifier for amplifying the noise component, even if the noise voltage level becomes larger than a specified constant level, the DC output detected by the detection circuit is suppressed, owing to the amplitude limiting action. Therefore, even for a rapid degradation of the SN ratio at low level inputs due to any deviation in the antenna pointing angle, it can keep the indication which is approximately proportional to the CN ratio.

DETAILED DESCRIPTION OF THE PREFERRED EMBODIMENTS

Figure 1:
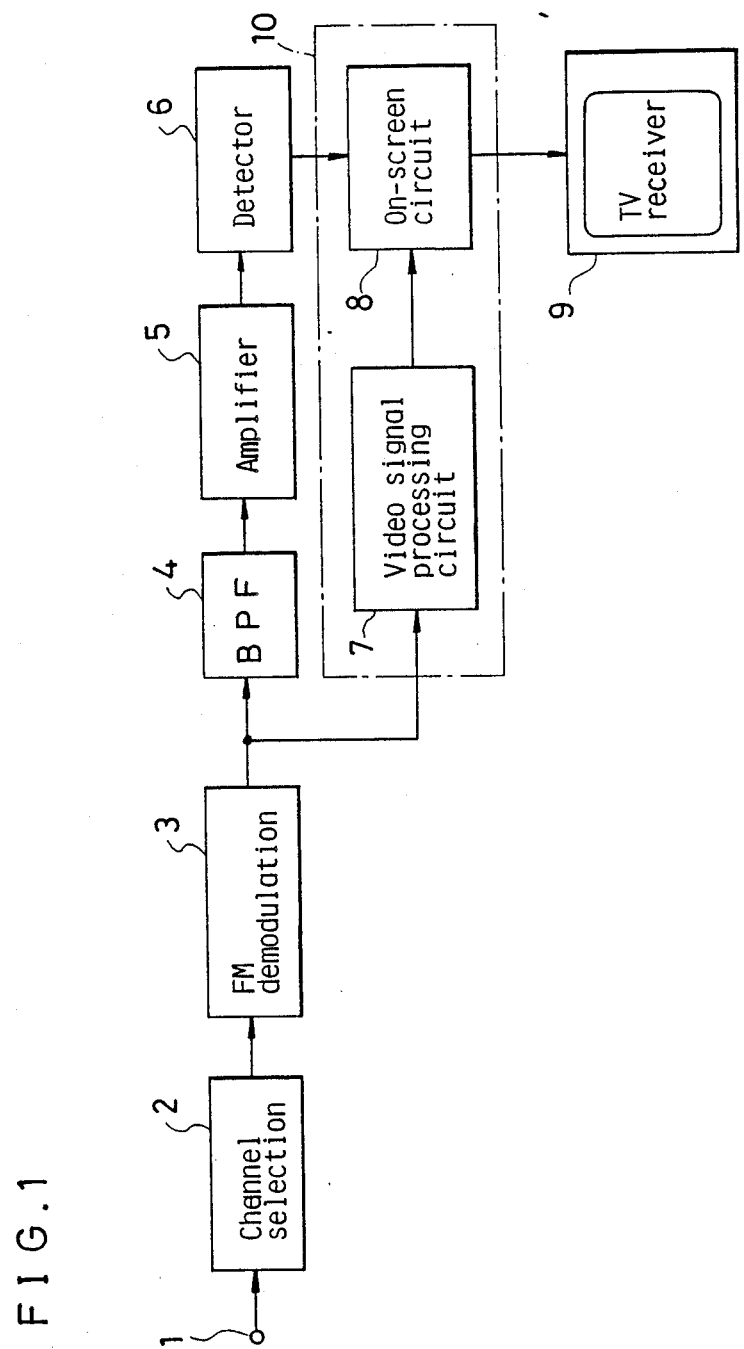
FIG. 1 is a block diagram of a satellite broadcasting receiver picture quality indicator in a first embodiment of the present invention.

In the following, on one embodiment of the present invention, explanation is given with reference to the drawings. FIG. 1 is a block diagram of a satellite broadcasting receiver picture quality indicator in a first embodiment of the present invention. In FIG. 1; numeral 1 designates a first IF input terminal through which the signal from a BS converter is fed by a coaxial cable; numeral 2 designates a channel selection circuit for selecting each station from a number of channels; numeral 3 designates an FM-demodulation circuit for demodulating the FM-modulated signal; numeral 4 designates a band-pass filter for extracting the noise component from the FM-demodulated output signal; numeral 5 designates an amplifier for amplifying the extracted signal up to a necessary level for the detection; numeral 6 designates a detector for obtaining a DC output (detected output) corresponding to the amount of noise power; numeral 7 designates a video signal processing circuit for performing the application of the de-emphasis on the FM-demodulation output or the removing of the energy dispersal signal components which are characteristic of the FM-demodulation output; numeral 8 designates an on-screen indication circuit, which superposes the detected output of the noise amount from the detector 6 on the video signal and indicates it on a TV receiver screen.

On the satellite broadcasting receiver picture quality indicator constituted as described above, its operation is elucidated below. First, the received signal inputted onto the first IF input terminal 1 of the BS tuner is channel-selected by the channel selection circuit 2, and after receiving the FM-demodulation by the FM-demodulation circuit 3. And then, after obtaining the video signal by carrying out the de-emphasis, the energy dispersal signal removal, and the audio sub-carrier signal removal in the video signal processing circuit 7, the informations such as the channel indication and volume indication are superposed on the video signal by the on-screen indication circuit 0, and thereafter it is sent to the TV receiver 9. The operation of the circuit described so far is ordinarily included in the functions of a BS tuner.

Figure 2:
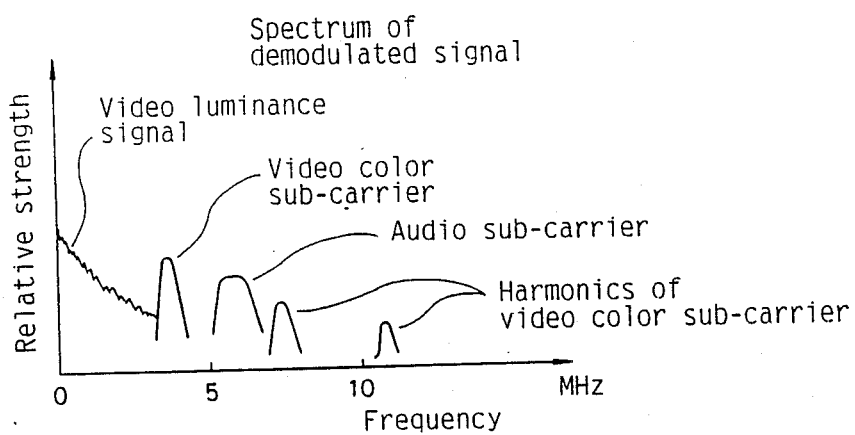
FIG. 2 is a spectral diagram of a demodulated signal in the demodulated output of a BS tuner.
Figure 3:
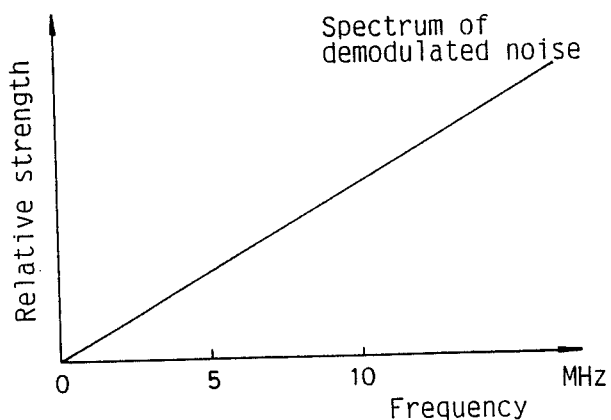
FIG. 3 is a spectral diagram of a demodulated noise in the demodulated output of a BS tuner.

The FM-demodulated signal is, as shown in FIG. 2, comprised of video luminance component, video color sub-carrier component (center frequency: 3.58 MHz), audio sub-carrier component (center frequency: 5.727272 MHz) and higher harmonics of video color sub-carrier components. And in the demodulated noise, as shown in FIG. 3 and as it is called as triangular noise, its noise power increases as the frequency increases. Therefore, for the band-pass filter (BPF) 4, which is for removing the demodulated signal component and for extracting only the noise component, it is desirable to take its center frequency to be around 8 MHz and its bandwidth to be of an order of 1 MHz. In case of selecting the center frequency of the BPF to be 11 MHz or higher, the demodulated signal component can be removed. However, in general, since the frequency bandwidth of the FM demodulator of the BS tuner is spreading over frequencies from 50 Hz up to about 8 MHz, and frequency components higher than this are not guaranteed and hence the output level of the noise component drops at high frequencies. Therefore, it becomes necessary to take the gain of the rear stages higher, but such high gain of the rear stage introduces a wide-scattering fluctuation of the noise component, and is not desirable.

Figure 4:
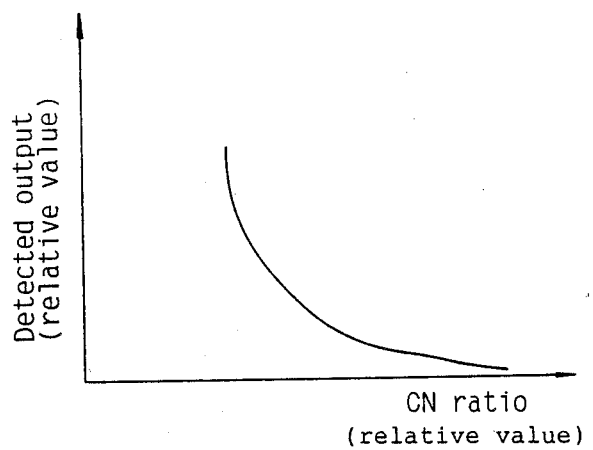
FIG. 4 is a characteristic curve showing a relation of the CN ratio versus detected noise output in the case using an amplifier excluding an amplitude limiting function.
Figure 5:
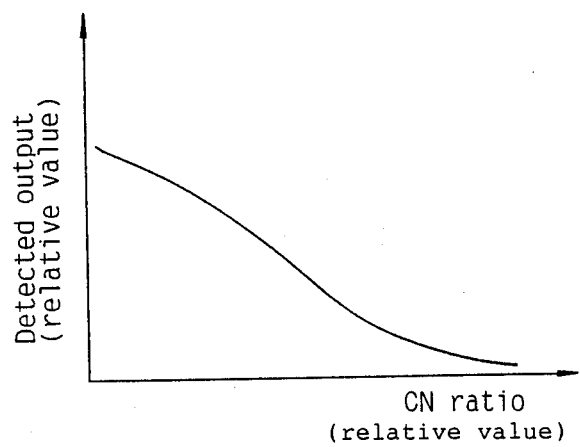
FIG. 5 is a characteristic curve showing a relation of the CN ratio versus detected noise output in the case using an amplifier having the amplitude limiting function.

The noise extracted by the BPF 4 is amplified by the amplifier 5 up to a sufficient level for the detection by the detector 6 using a diode, and inputted into the detector 6 and detected there. In case of absence of the amplitude limiting function in the amplifier 5, when the CN ratio of the input signal is changed, for example, when the CN ratio drops, the detected output increases sharply as is shown in FIG. 4. This is considered to be caused by that, in the case of satellite broadcasting, since the FM is employed for the modulation of the video signal, at levels below about 9 dB, the so-called threshold phenomenon takes place and hence the noise level increases sharply. If the detected output thus obtained as described above and as shown in FIG. 4 is indicated directly, that is, without adding any processing, the linearity of the indication output against the change of the CN is not a desirable one, and an available range of the indication is also limited. For this reason, a certain device for eliminating the above-mentioned difficulty is required. Thus by limiting the noise amplitude not so as to exceed a specified value by means of giving an amplitude limiting function to the gain of the amplifier, the linearity of the detected output against the CN ratio is improved and can be brought into such as shown in FIG. 5.

Figure 6:
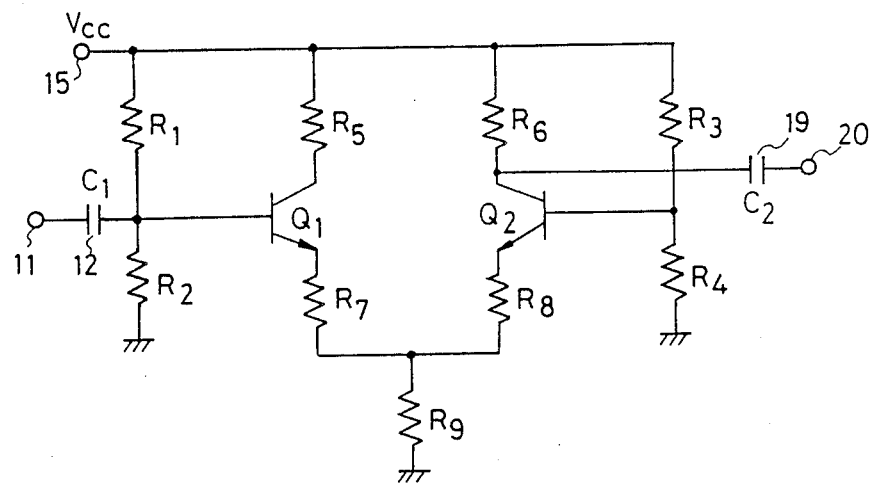
FIG. 6 is a circuit diagram which shows an example of an amplifier having the amplitude limiting function.
Figure 7:
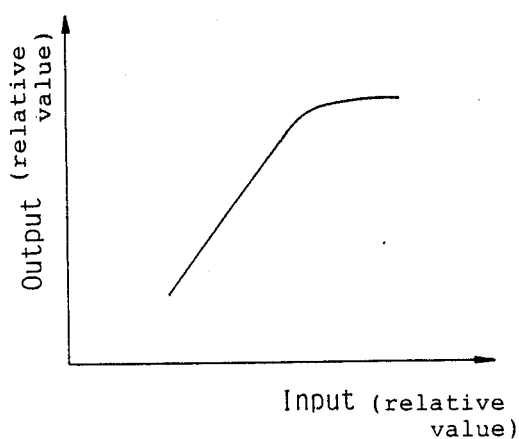
FIG. 7 is an input-output characteristic of such the amplifier.

The amplifier having the amplitude limiting function can be realized using a transistorized differential amplifier as shown in FIG. 6, wherein $Q_1$ and $Q_2$ are transistors, $R_1$, $R_2$, $R_3$ and $R_4$ are bias resistors of transistors $Q_1$ and $Q_2$, $R_5$ and $R_6$ are load resistors, $R_7$, $R_8$ and $R_9$ are emitter resistors. Terminals 11 and 20 are input and output terminals, respectively, and terminal 15 is for connection to a positive power source terminal. The input-output characteristic of this differential amplifier is shown in FIG. 7, whose curve shows a constant gain in a region where the input levels are small. This is because, when the input becomes large, the output cannot become large exceeding the difference between the power supply voltage and the emitter voltage, and a gain saturation region appears in a region where the input levels are large as shown in FIG. 7. If this amplifier is used as a final stage of the noise amplifier, the noise voltage cannot become larger than a specified value. Then it becomes possible to suppress a sharp increase of the noise power to be applied to the detector due to a degradation of the CN ratio caused by the threshold phenomenon, and hence a detected output as shown in FIG. 5 is obtained.

Figure 8:
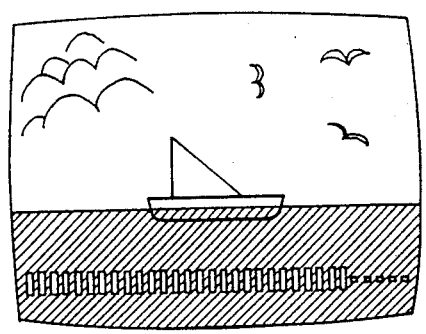
FIG. 8 is a plan view showing an indication scheme on a displayed TV picture.

By inputting the detected output proportional to the noise power thus obtained from the detector 6 to the on-screen indication circuit 8 and superposing it on the video signal, the indication of the amount proportional to the CN ratio can be displayed on superposed on TV picture on the screen of the TV receiver 9. Hereupon, as an indication scheme on the picture screen, the bar indication on the TV picture, for example, as shown in FIG. 8 may be employed. For example, the scheme of the bar indication to represent the CN ratio is such that the number of white bars increases as the picture quality increases up to a maximum number of e.g. 32 bars for the highest quality.

And, if the detected output is indicated by a voltmeter, it can also be utilized for the BS antenna pointing angle adjustment.

[Second Embodiment]

Figure 9:
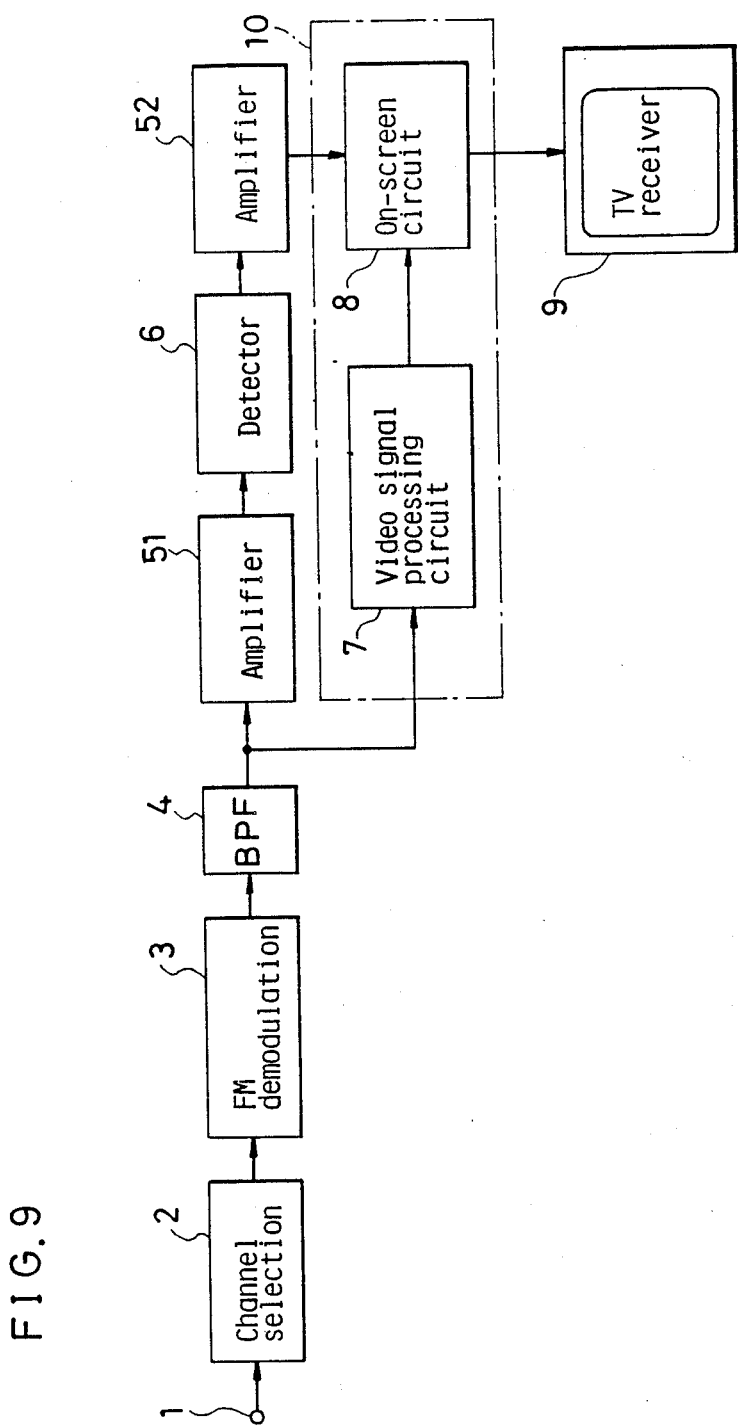
FIG. 9 is a block diagram of a satellite broadcasting receiver picture quality indicator in a second embodiment of the present invention.

Next, on a second embodiment of the present invention, explanation is given with reference to the drawings. FIG. 9 is a block diagram of a satellite broadcasting receiver picture quality indicator of the second embodiment of the present invention. Corresponding parts and components to the first embodiment are shown by the same numerals and marks, and the description thereon made in the first embodiment similarly apply. Differences and features of this second embodiment from the first embodiment are as follows. In FIG. 9, differences from the first embodiment of FIG. 1 are those points that an amplifier 51 having no amplitude limiting function is employed as the amplifier for amplifying the output of a BPF 4, and an amplifier 52 having a nonlinear amplification function is added to the output side of the detector 6, then thereafter its output is connected to an on-screen indication circuit 8.

Figure 10:
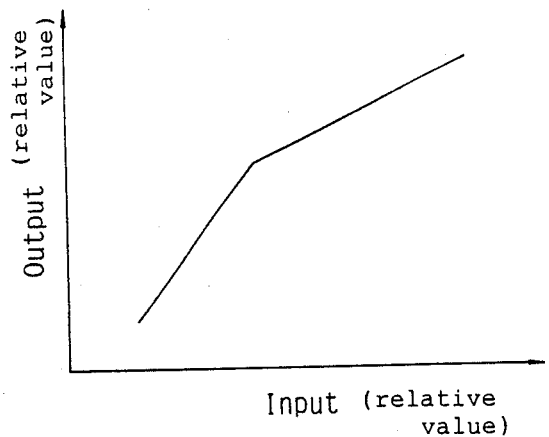
FIG. 10 is an output characteristic of an amplifier of the above-mentioned satellite broadcasting receiver picture quality indicator.
Figure 11:
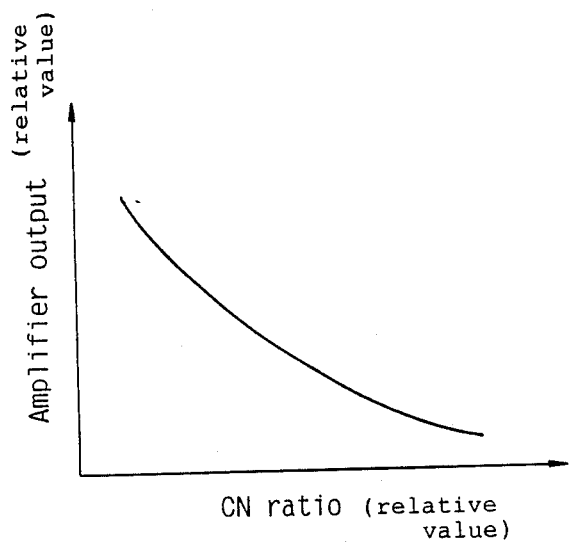
FIG. 11 is a characteristic curve showing a relation of the output versus the CN ratio of the amplifier.

Operation of the satellite broadcasting receiver picture quality indicator constituted as described above is explained below. Since up to the extraction of the noise component by the BPF 4, its operation is the same as in the first embodiment, explanation for this part is omitted here. Different from the first embodiment, as for the amplifier 51, since an amplifier without having the amplitude limiting function is employed, when the CN ratio is changed, the detected output of the detector 6 increases sharply where the CN ratio becomes below 9 dB, as is shown in FIG. 4. If the output is directly displayed on the TV receiver 9 through the indication means 10, the linearity of the indicated output for the change of the CN ratio is not good, and a range which can be indicated is limited. The example of FIG. 10 is for improving such problem as poor lineality. That is, by letting the amplifier 52 provided at the output side of the detector 6, an input-output characteristic is obtained that the gain is boosted while the input is small, whereas it becomes relatively suppressed when the input becomes large, so that the linearity of output of the amplifier 52 for the Cn ratio is improved as shown in FIG. 11.

Figure 12:
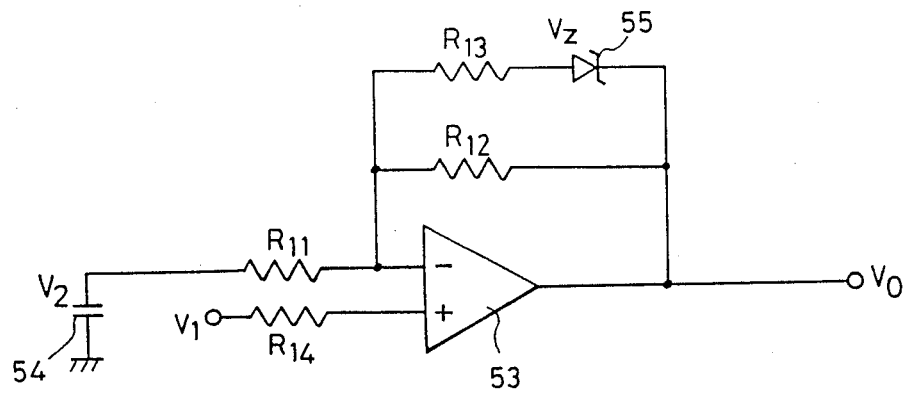
FIG. 12 is a circuit diagram showing an example of the amplifier in the second embodiment.
Figure 13:
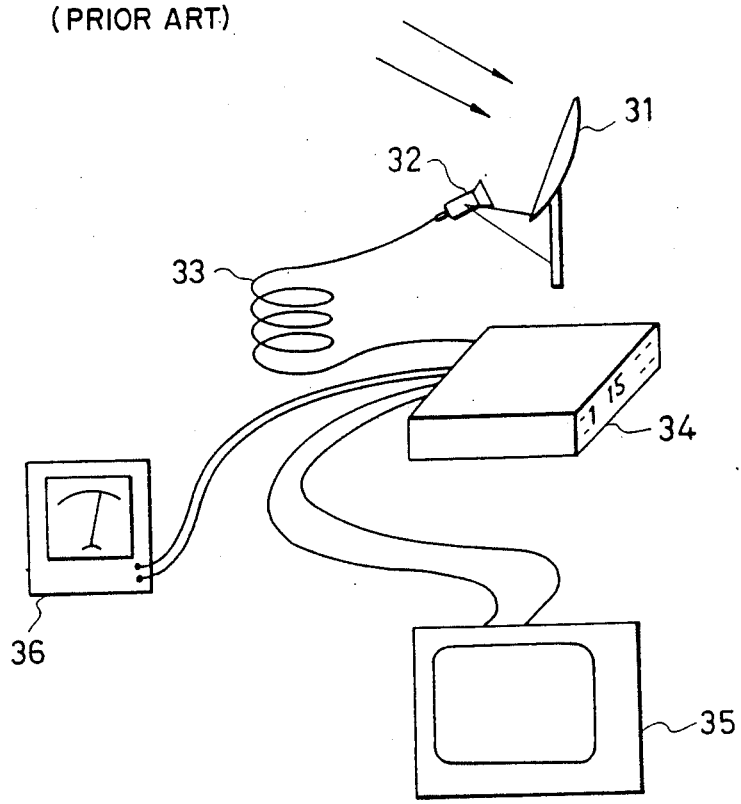
FIG. 13 is an illustration showing an antenna pointing angle adjustment scheme using an AGC output terminal.
Figure 14:
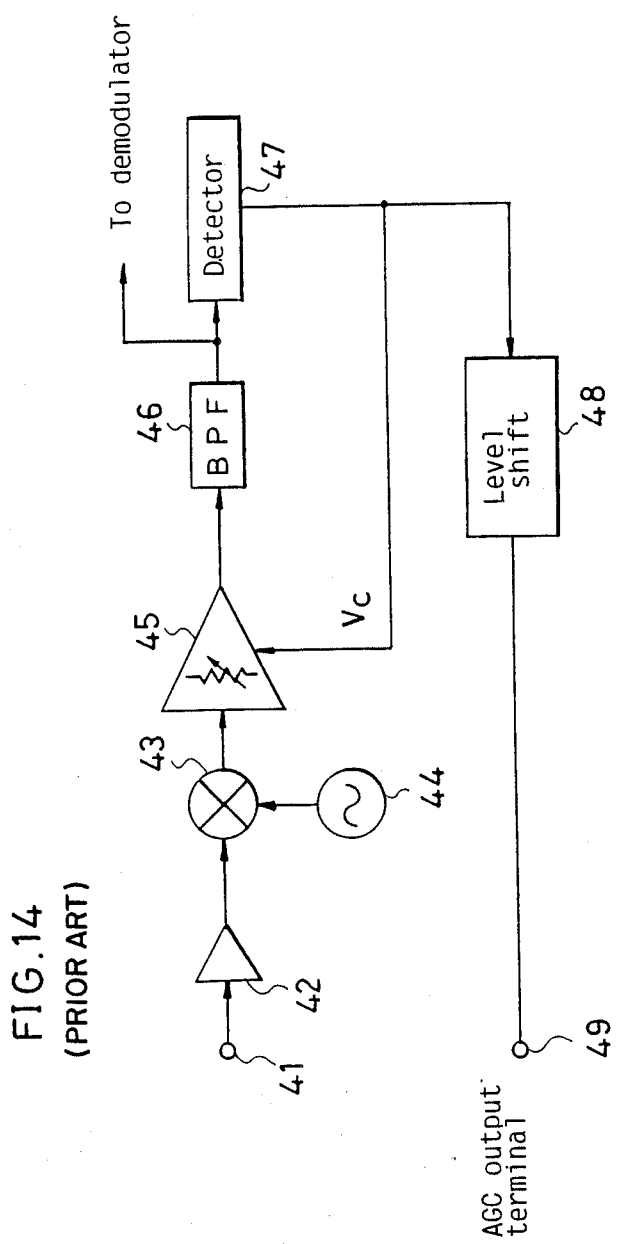
FIG. 14 is a block diagram showing the constitution of a BS tuner for obtaining the AGC output.
Figure 15:
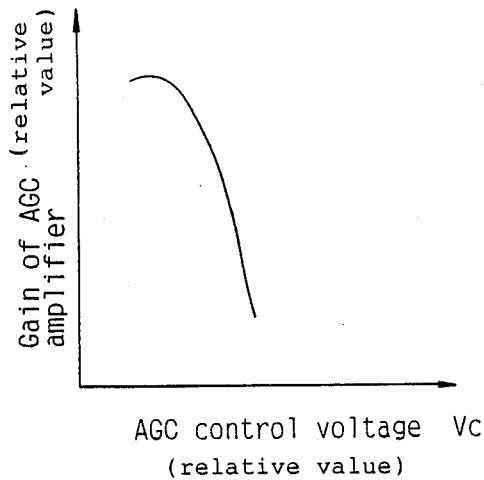
FIG. 15 and FIG. 16 are characteristic curves showing that the AGC output terminal is proportional to the first IF signal level.
Figure 16:
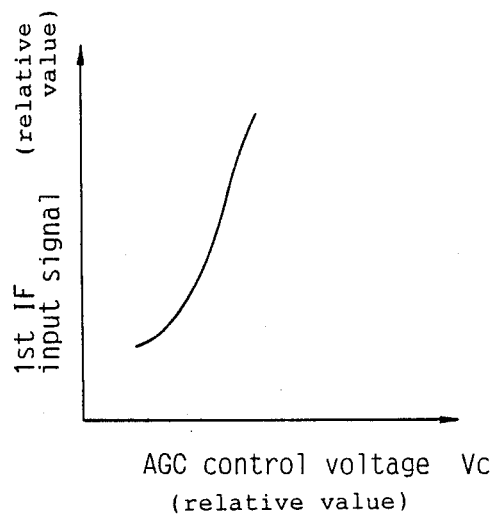

The amplifier having an input-output characteristic as shown in FIG. 10 can be realized by a circuit including an operational amplifier as shown in FIG. 12. Therein, $R_{11}$, $R_{12}$, $R_{13}$ and $R_{14}$ are bias resistors of an operational amplifier 53 and they determine the bias voltages with the help of a voltage source 54 and a Zener diode 55. The input-output characteristic of this amplifier can be expressed by the following equation; when $$V_0 - V_1 < V_z, \qquad (3)$$

$$V_0 = \left(1 + \frac{R_2}{R_1}\right)V_1 - \frac{R_2}{R_1}V_2,$$

and when $$V_0 - V_1 \geq V_z, \qquad (4)$$

$$V_0 = \left(1 + \frac{R_2}{R_1} \cdot \frac{1}{1 + \frac{R_2}{R_3}}\right)V_1 -$$

$$\frac{R_2}{R_3} \cdot \frac{1}{1 + \frac{R_2}{R_3}} V_2 + \frac{1}{1 + \frac{R_2}{R_3}} V_z.$$

As is understood from the above equation, when the input voltage $V_1$ is small and a difference with respect to the output voltage $V_0$ is smaller than the Zener voltage $V_z$, the Zener diode is not in the conductive state. Hence, the input-output characteristic is expressed by Eq. (3), whereas, when the input voltage $V_1$ becomes large and a difference with respect to the output voltage $V_0$ becomes large and the Zener diode becomes conductive state, the input-output characteristic becomes to be expressed by Eq. (4), and thus the gain decreases.

By inputting the output of the amplifier 52 thus obtained into the on-screen indication circuit 8 and thus superposing it on the video signal, it becomes possible to indicate the value corresponding to the CN ratio on the screen of the TV receiver 9.

As has been described above, in the present invention, by extracting the noise component from the FM demodulated output and by detecting it, the output proportional to the noise power is obtained, and by indicating it as the CN ratio, it can be used for the purpose of the antenna pointing angle adjustment, and also the picture quality indication for the satellite broadcasting receiver becomes possible, hence its practical usefulness is large.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Picture quality indicator for satellite broadcasting receiver comprising:
   an FM-demodulator for demodulating the satellite broadcasting signal,
   a band-pass filter for extracting a noise component from the output signal of said FM demodulator thereby removing TV signal components,
   an amplifier for amplifying said noise component,
   a detection circuit for detecting and outputting the amount of the noise component output from said amplifier, and
   a level indicator for indicating a value corresponding to a CN ratio of the TV signal obtained on the basis of the output of said detection circuit.

2. Picture quality indicator for satellite broadcasting receiver in accordance with claim 1, wherein the band-pass filter passes only the noise component which includes no video luminance signal component, no color sub-carrier nor its second, third harmonic components, and no audio sub-carrier component nor its harmonic components.

3. Picture quality indicator for satellite broadcasting receiver stated in claim 1, wherein the amplifier amplifying the noise component is an amplitude-limiting type amplifier wherein the amplification gain decreases as the noise level increases.

4. Picture quality indicator for satellite broadcasting receiver comprising:
   an FM-demodulator for demodulating the satellite broadcasting signal,
   a band-pass filter for extracting a noise component from the output signal of said FM demodulator thereby removing TV signal components,
   a first amplifier for amplifying said noise component,
   a detection circuit for detecting and outputting the amount of the noise component output from said first amplifier,
   a second amplifier for amplifying the output of said detection circuit, said second amplifier having a variable gain characteristic such that the gain thereof decreases as the input thereto increases, and
   a level indicator for indicating a value corresponding to a CN ratio of the TV signal obtained on the basis of the output of said detection circuit.

* * * * *